(12) United States Patent
Park et al.

(10) Patent No.: US 7,450,805 B2
(45) Date of Patent: Nov. 11, 2008

(54) OPTICAL FIBER UNIT FOR AIR BLOWN INSTALLATION AND MANUFACTURING METHOD THEREOF

(75) Inventors: Chan-Yong Park, Seoul (KR); Bong-Hoon Lee, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 213 days.

(21) Appl. No.: 10/541,741

(22) PCT Filed: Jul. 31, 2003

(86) PCT No.: PCT/KR03/01541

§ 371 (c)(1), (2), (4) Date: Jul. 6, 2005

(87) PCT Pub. No.: WO2004/061508

PCT Pub. Date: Jul. 22, 2004

(65) Prior Publication Data

US 2006/0115225 A1    Jun. 1, 2006

(30) Foreign Application Priority Data

Jan. 7, 2003    (KR) ..................... 10-2003-0000888

(51) Int. Cl.
G02B 6/02 (2006.01)
B05D 5/06 (2006.01)

(52) U.S. Cl. ..................... 385/123; 385/100; 385/128; 427/163.2

(58) Field of Classification Search .............. 385/128, 385/100, 102, 123; 427/162, 163.1, 163.2
See application file for complete search history.

(56) References Cited

U.S. PATENT DOCUMENTS

| | | | | | |
|---|---|---|---|---|---|
| 4,976,519 | A | * | 12/1990 | Davey et al. | 385/102 |
| 4,997,256 | A | * | 3/1991 | Sano et al. | 385/102 |
| 5,011,332 | A | | 4/1991 | Kunze et al. | |
| 5,042,907 | A | * | 8/1991 | Bell et al. | 385/123 |
| 5,533,164 | A | * | 7/1996 | Preston et al. | 385/128 |
| 5,555,335 | A | * | 9/1996 | Barker et al. | 385/100 |

(Continued)

FOREIGN PATENT DOCUMENTS

CN    1343317 A    4/2002

(Continued)

OTHER PUBLICATIONS

International Search Report.

*Primary Examiner*—Kevin S Wood
*Assistant Examiner*—John M Bedtelyon
(74) *Attorney, Agent, or Firm*—Jones Day (57) ABSTRACT

An optical fiber unit for air blown installation includes at least one optical fiber having a core layer and a clad layer, a protective layer coated on the surface of the optical fiber; and protrusions made of polymer resin and formed on the outer circumference of the protective layer in a banded shape. The protrusions may be formed either by supplying polymer resin to the outer circumference of the optical fiber with passing the optical fiber through an extrusion dice in which grooves of a predetermined shape are formed on a hollow inner circumference thereof, or by supplying polymer resin to the outer circumference of the optical fiber through nozzles with moving the optical fiber in a longitudinal direction.

16 Claims, 9 Drawing Sheets

U.S. PATENT DOCUMENTS

| | | | |
|---|---|---|---|
| 6,233,384 B1 * | 5/2001 | Sowell et al. | 385/107 |
| 6,404,972 B1 * | 6/2002 | Pasch et al. | 385/147 |
| 2002/0057878 A1 | 5/2002 | Takano et al. | |
| 2002/0136509 A1 * | 9/2002 | Watson | 385/100 |

FOREIGN PATENT DOCUMENTS

| | | |
|---|---|---|
| FR | 2054863 A | 5/1971 |
| FR | 2660790 A1 | 10/1991 |
| JP | H06-300946 | 10/1994 |
| JP | 2001-21781 | 1/2001 |

* cited by examiner

FIG. 1

Prior Art

FIG. 2

Prior Art

OPTICAL FIBER UNIT FOR AIR BLOWN INSTALLATION AND MANUFACTURING METHOD THEREOF

TECHNICAL FIELD

The present invention relates to an optical fiber unit, and more particularly to structure of an optical fiber unit for air blown installation and a method for manufacturing the optical fiber unit.

BACKGROUND ART

An optical fiber is broadly used for long-distance rapid transmission owing to its low transmission loss and great bandwidth. For installation of the optical fiber conventionally, several optical fibers are bound or twisted to be a cable, and then this cable is installed. In recent, the optical fibers are generally installed by blown air.

According to the air blown installation, a tube made of polymer material having a diameter of 5 to 8 mm, called a micro tube or duct, is buried in an installation spot in advance, and then an optical fiber unit having 1 to 12 cores are installed therein with the use of blown air. The optical fiber installed by blown air (so called, Air Blown Fiber: ABF) is installed using fluid drag force, so it is important that the surface of the optical fiber is configured to receive more fluid drag force.

Figure 1:
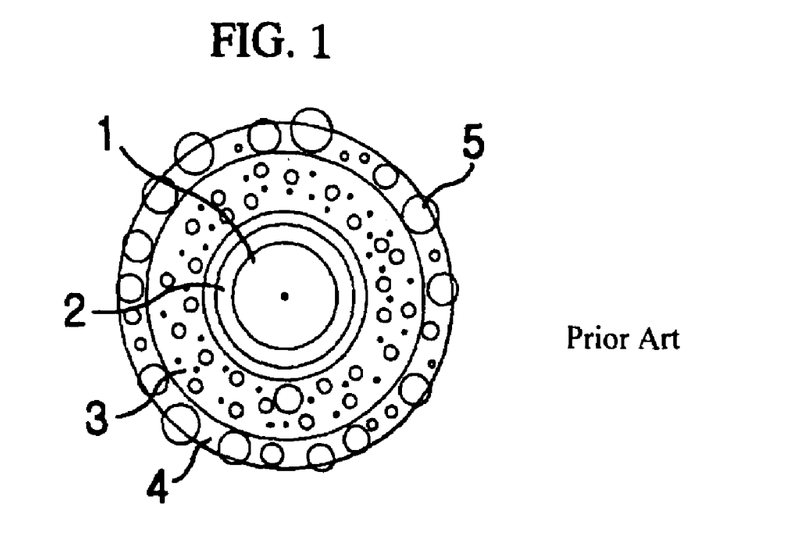
FIG. 1 is a sectional view showing an optical fiber unit according to an example of the prior art.

A technique for processing the outer surface of ABF is disclosed in U.S. Pat. No. 5,042,907 that is schematically shown in FIG. 1. As shown in FIG. 1, glass beads 5 are provided on the outer surface of the optical fiber 1 so that the optical fiber is better affected by the blown air. In other words, the glass beads are stirred together with a coating resin, and then uniformly coated on the outer surface of the optical fiber 1. At this time, the size of the glass bead 5 received in the resin 4 of the outer surface of the optical fiber should be relatively larger than the thickness of the coating layer, and the glass bead 5 should have high Young's modulus in order to generate propulsive force due to the blown air. However, such high Young's modulus of the glass bead deteriorates bend characteristic of the optical fiber unit. In addition, cracks may happen between the glass bead 5 and the resin 4, and these cracks may be propagated inside the optical fiber. In such a reason, an intermediate layer 3 should be interposed between an inner buffer layer 2 and the resin 4 of the outer surface. However, this configuration requires at least three coating processes, thereby complicating the manufacturing procedure and increasing costs.

Figure 2:
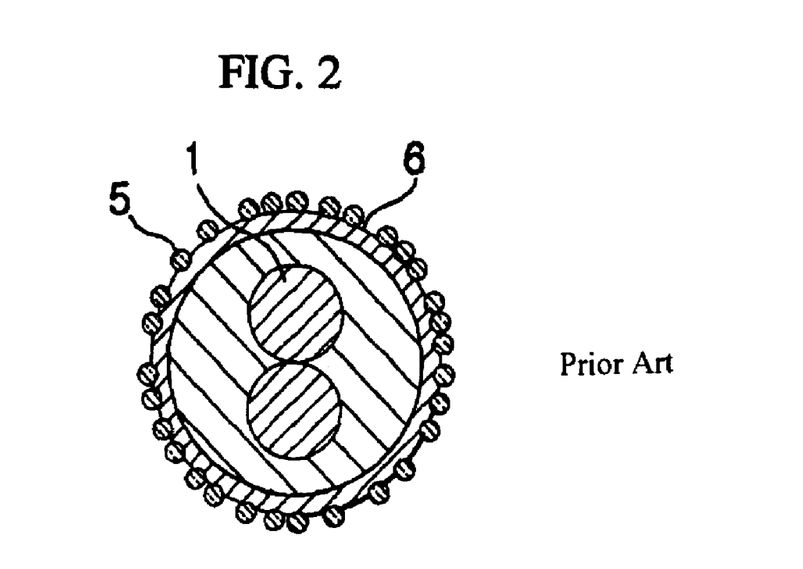
FIG. 2 is a sectional view showing an optical fiber unit according to another example of the prior art.

Another conventional technique for processing the surface of the optical fiber is disclosed in U.S. Pat. No. 5,555,335 shown in FIG. 2. According to this technique, after a resin is coated on an optical fiber 1, glass beads are attached on the outer surface 6 of the optical fiber by means of static electricity before the outer surface is cured. However, some glass beads are apt to be detached from the outer surface since the adhesive force of the glass beads is not regular on the outer surface of the optical fiber. The glass beads not adhered to but detached from the outer surface may damage the optical fiber unit while the unit is installed.

As another conventional technique, a dimple may be formed on the surface of the optical fiber with the use of foaming polymer materials. However, the foaming polymer material increases the coefficient of friction, so an installation length of the optical fiber for a unit work is too short and the hardness of the optical fiber unit is too weak.

On the other hand, it has ever been proposed to install a ribbon-type optical fiber by winding a fiber of a particular material. However, since the ribbon-type optical fiber has a direction to the bending, the optical fiber tends to be bent only to one direction.

DISCLOSURE OF INVENTION

The present invention is designed to solve the problems of the prior art, and therefore an object of the invention is to provide an optical fiber unit for air blown installation which is capable of receiving more fluid drag force by forming protrusions of various types on the surface of the optical fiber unit inserted into a tube for optical fiber unit installation, and a manufacturing method of the optical fiber unit having simplified processes.

In order to accomplish the above object, the present invention provides an optical fiber unit for air blown installation into a tube, which includes at least one optical fiber having core layer and clad layer; a protective layer coated on a surface of the optical fiber; and a protrusion made of polymer resin and formed on an outer surface of the protective layer in a banded shape.

The protrusion may be formed continuously or discontinuously, and the protrusion may have a spiral, waved or sine-waved pattern. In addition, the protrusion may have various sectional shapes such as triangle, semicircle, arc, trapezoid, or unevenness.

According to one aspect of the invention, there is provided a method for manufacturing an optical fiber unit for air blown installation, which includes the steps of passing at least one optical fiber having core layer and clad layer through a hollow extrusion dice in which a predetermined groove is formed on an inner surface thereof; and forming a protrusion having a banded shape on the outer surface of the optical fiber by supplying polymer resin on an outer surface of the optical fiber so that.

According to another aspect of the invention, there is also provided a method for manufacturing an optical fiber unit for air blown installation, which includes the step of forming a protrusion having a banded shape on an outer surface of at least one optical fiber having core layer and clad layer by supplying polymer resin through a nozzle on the outer surface of the optical fiber while moving the optical fiber along a longitudinal direction thereof.

Here, the protrusion is preferably formed in a spiral, waved, or sine-waved pattern by rotating the nozzle around the optical fiber or rotating the optical fiber.

In addition, the protrusion may be formed discontinuously by supplying the polymer rein on the outer surface of the optical fiber discontinuously.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
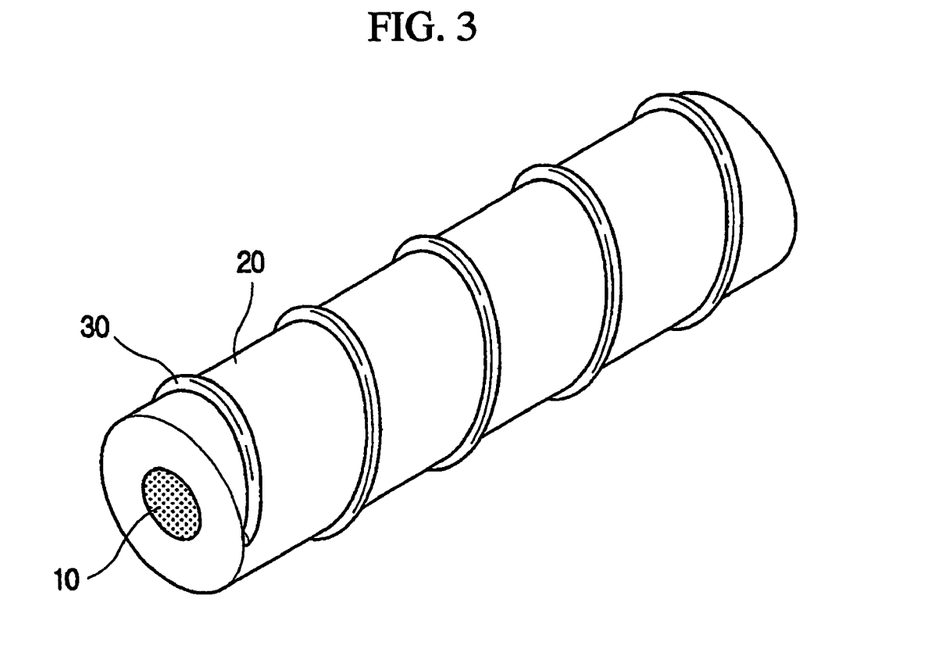
FIGS. 3 to 5 are perspective views showing protrusions of various patterns according to preferred embodiments of the present invention.

FIG. 3 is a perspective view showing an optical fiber unit according to a preferred embodiment of the present invention. Referring to FIG. 3, the optical fiber unit of the present invention includes an optical fiber 10 having core layer and clad layer, a protective layer 20 surrounding the optical fiber 10, and a protrusion 30 formed on the outer surface of the protective layer 20.

The optical fiber 10 includes a core layer for transmission of optical signals, and a clad layer surrounding the core layer. The optical fiber 10 may also include a protective layer made of silicon or similar protective materials for protecting the inside of the optical fiber from external impurities and moisture. The present invention may adopt either a single-mode optical fiber or a multi-mode optical fiber, and the optical fiber may be configured in a ribbon bundle for easy access. In addition, the optical fiber may further include an additional protective layer, and a coloring layer for identification of the optical fiber.

The protrusion 30 is formed on the outer surface of the protective layer 20 so that the optical fiber unit may receive fluid drag force during air blown installation. The protrusion 30 is formed on the protective layer 20 continuously or discontinuously along a longitudinal direction of the optical fiber.

Figure 4:
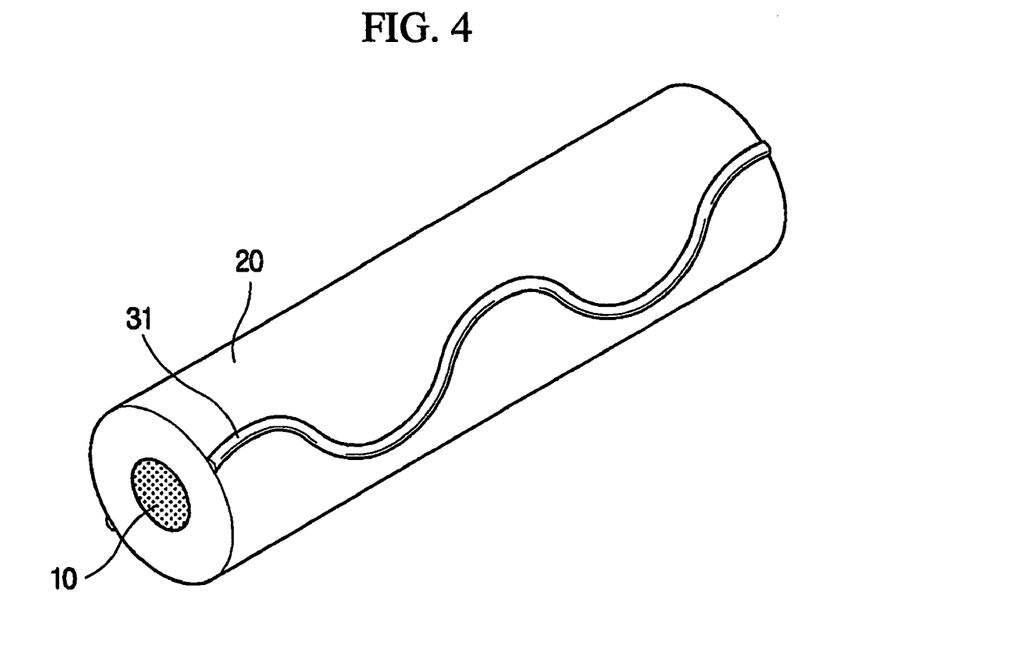

For example, the protrusion 30 may be spirally extended along the longitudinal direction on the outer surface of the protective layer 20, as shown in FIG. 3. In other cases, a waved protrusion 31 is formed on the outer surface of the protective layer 20 as shown in FIG. 4, or a protrusion of another pattern such as a sine-wave (not shown) may be formed thereon.

Figure 5:
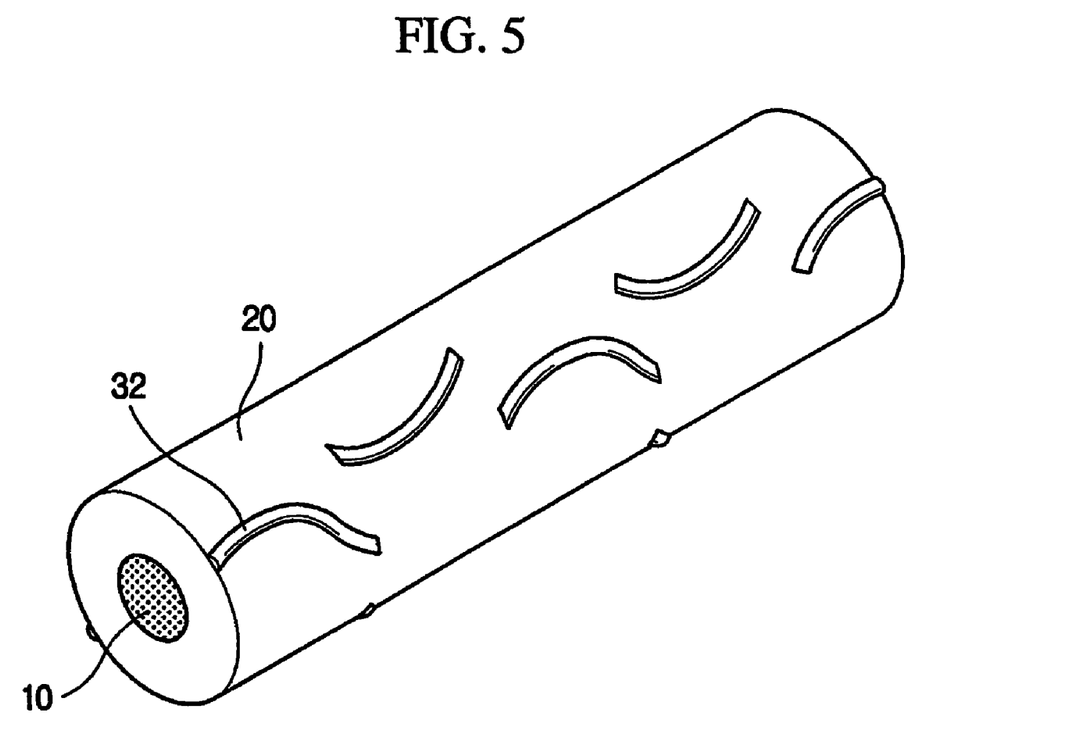

In addition, as shown in FIG. 5, a lot of protrusions 32 may be irregularly arranged with a space therebetween on the outer surface of the protective layer 20 so that the protrusions 32 are discontinuously formed. Furthermore, it is also possible to form a protrusion of a continuous banded shape and protrusions of discontinuous banded blocks together.

The protrusion may have various sectional shapes such as rectangle, triangle, semicircle, arc, trapezoid, or unevenness.

The protrusion may be made of the same material as the protective layer 20. If the protrusion is made of different material to the protective layer 20, it is possible to form a coating layer made of glass, ceramic or polymer resin on the surface of the protective layer 20 and the protrusion(s) 30, 31, 32 or 60 in order to prevent deterioration of adhesive force due to the use of different materials in advance. See, e.g., FIG. 9A, coating layer 35.

Figure 6:
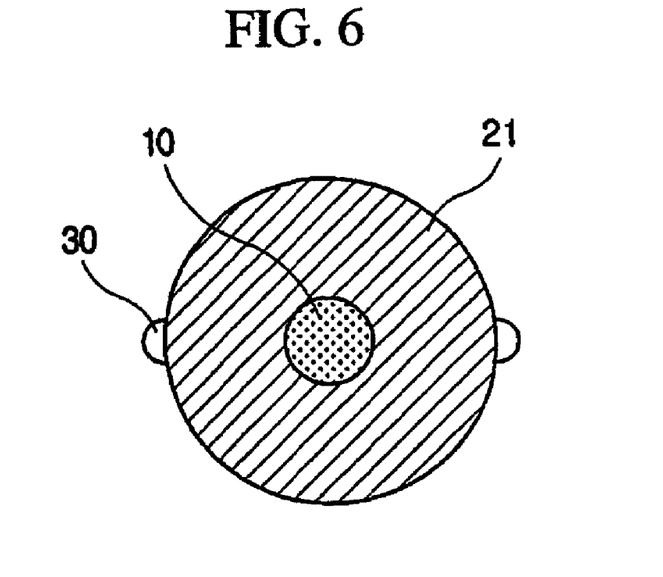
FIGS. 6 to 10 are sectional views showing a single-core optical fiber unit of various structures according to preferred embodiments of the present invention.

FIG. 6 shows an example of the optical fiber unit according to an embodiment of the present invention. Referring to FIG. 6, a buffer layer (or, a protective layer) 21 surrounds the optical fiber 10. Preferably, the optical fiber unit of the present invention has a circular section, and two protrusions 30 are formed on the outer surface thereof at opposite positions.

Figure 7:
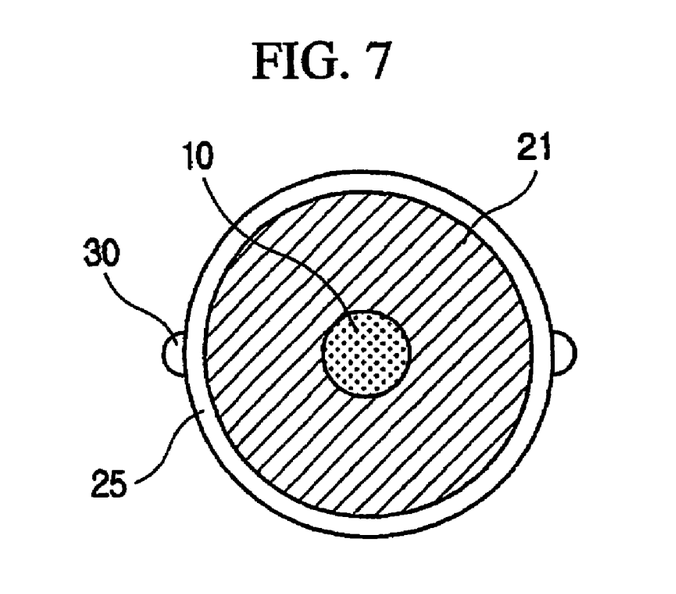

FIG. 7 shows another example of the optical fiber unit according to the present invention. Referring to FIG. 7, the optical fiber unit includes an optical fiber 10, and a protective layer for protecting the optical fiber. The protective layer includes a buffer layer 21, and a sheath 25 formed on the outer surface of the buffer layer 21. In addition, the protrusions 30 made of the same material as the sheath are formed on the outer surface of the sheath 25. The sheath 25 is a coating layer made of durable materials such as plastic or nylon, and plays a role of relieving external impact to the optical fiber unit. In this reason, the sheath 25 preferably has a Young's modulus of 400 to 1000 MPa under the condition of 2.5 strain, more preferably 500 to 800 MPa under the same condition. If the Young's modulus of the sheath is lower than the lowest limit, it is more difficult to install the optical fiber unit with the use of blown air, while, if the Young's modulus is too high, cracks may happen due to the bending.

Figure 8:
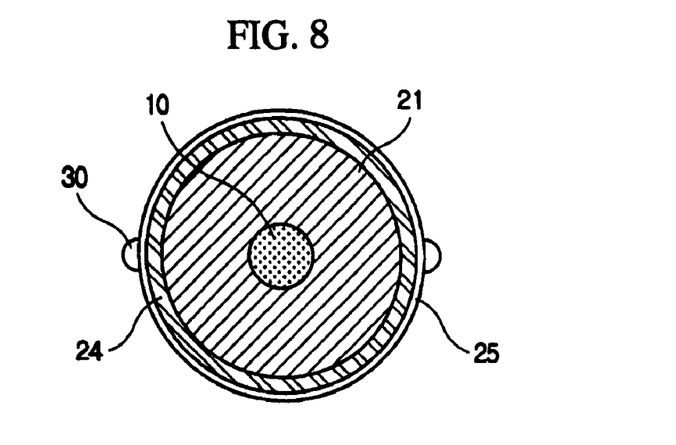

FIG. 8 is another example of the optical fiber unit according to the present invention. The optical fiber unit of FIG. 8 further includes an intermediate layer 24, compared with that of FIG. 7. The intermediate layer 24 is formed between the buffer layer 21 and the sheath 25, and plays a role of preventing cracks of the sheath 25, if happen, from being propagated into the optical fiber unit. In addition, the protrusions 30 are formed on the outer surface of the sheath 25 for receiving fluid drag force.

Figure 9:
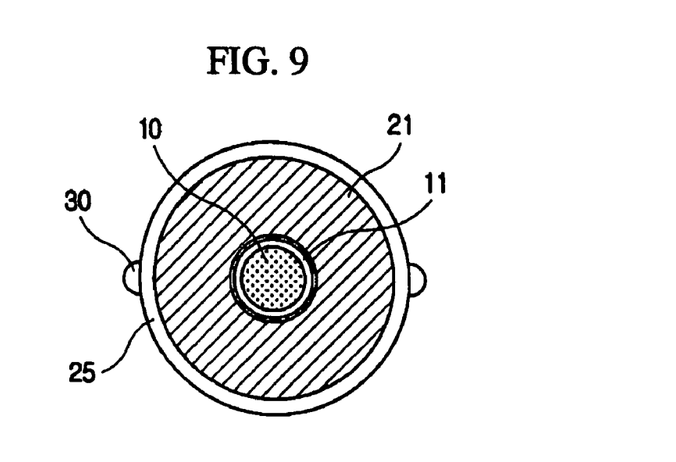
Figure 9A:
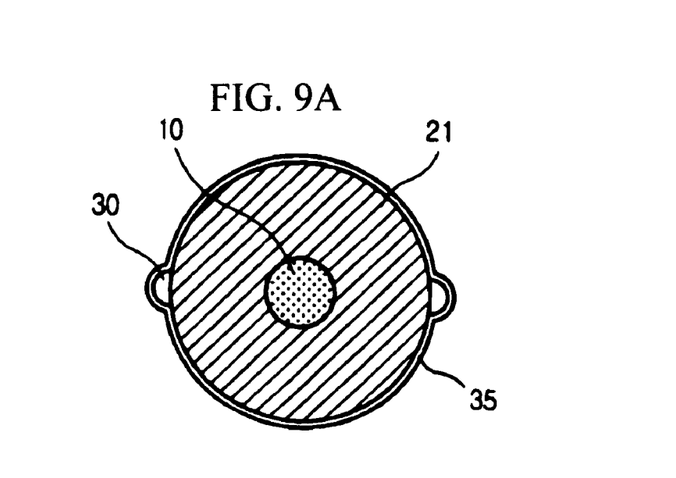

FIG. 9 shows another example of the optical fiber unit according to the present invention. The optical fiber unit shown in FIG. 9 is identical to that of FIG. 7, except that a coloring layer 11 is provided on the outer surface of the optical fiber 10. The coloring layer 11 facilitates to identify the kind of optical fibers during installation or repair of the optical cable. In this example, the protrusions 30 are also symmetrically formed on the sheath 25 for receiving more fluid drag force.

Figure 10:
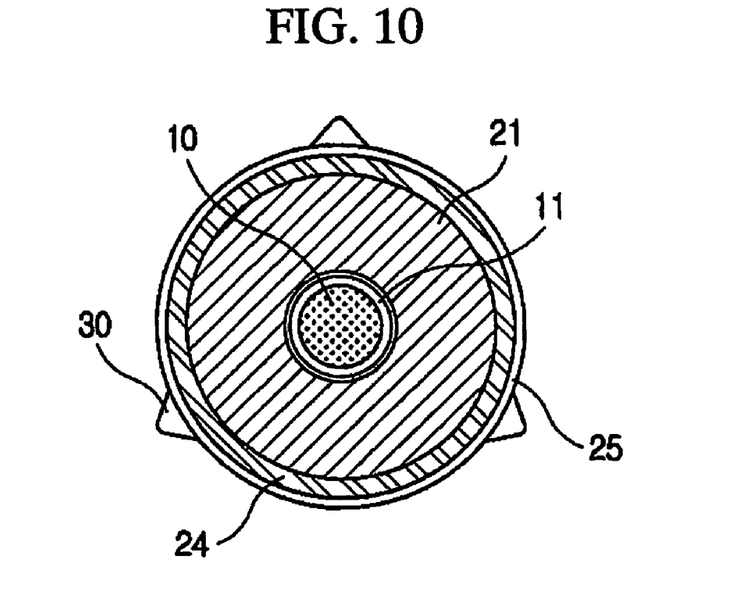

FIG. 10 shows another example of the optical fiber unit according to the present invention. The optical fiber unit of FIG. 10 includes the optical fiber 10 having the coloring layer 11, the buffer layer 21, the intermediate layer 24, and the sheath 25. In addition, on the outer surface of the sheath 25, protrusions 30 having a triangular section are formed at symmetric positions along the circumference of the optical fiber unit.

Figure 11:
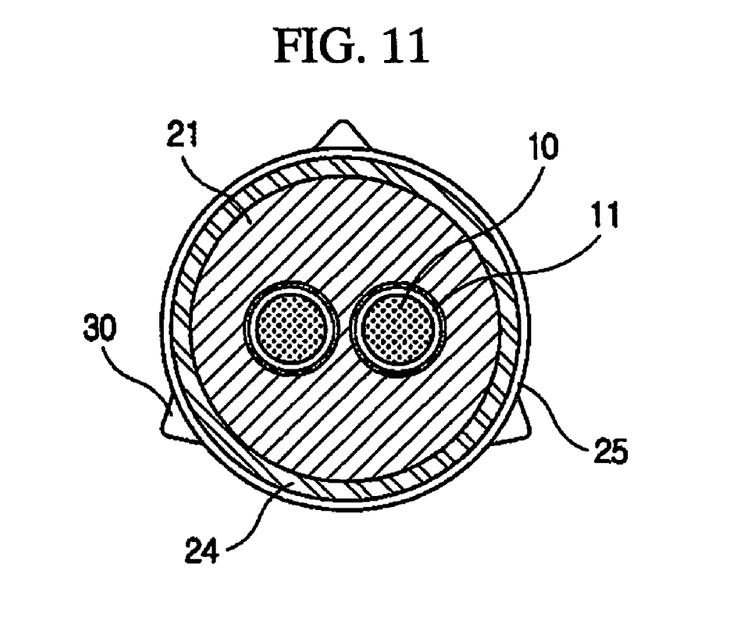
FIG. 11 is a sectional view showing a multi-core optical fiber unit according to a preferred embodiment of the present invention.

FIG. 11 shows another example of the optical fiber unit according to the present invention. The optical fiber unit of FIG. 11 includes two optical fibers 10, each having the coloring layer 11 therearound. In addition, the protrusions 30 symmetrically formed on the sheath 25 have a triangular section. The buffer layer 21 surrounding the optical fibers 10 has so great hardness to endure external pressure or bending. For example, Young's modulus and hardness of the sheath 25 should be larger than those of the buffer layer 21, preferably at least three times. In addition, the intermediate layer 24 formed between the sheath 25 and the buffer layer 21 should have Young's modulus and hardness larger than the buffer layer 21. Seeing Young's modulus and hardness of the whole layers, the sheath 25 has the greatest Young's modulus and hardness, the intermediate layer 24 has Young's modulus and hardness identical to or lower than the sheath 25, and the buffer layer 21 has the smallest Young's modulus and hardness.

As other examples of the present invention, optical fiber units having a ribbon-type optical fiber 40 therein are shown in FIGS. 12 to 15. The ribbon-type optical fiber 40 has a plurality of optical fibers in the ribbon, and the plurality of optical fibers are bound with the use of a jacket made of polyethylene (PE), polyurethane or polyvinylchloride (PVC) in a bundle. In addition, when many optical fibers are inserted in the optical fiber unit as mentioned above, it is also possible to replace at least one optical fiber with Kevlar (manufactured by Dupont Co.).

Figure 12:
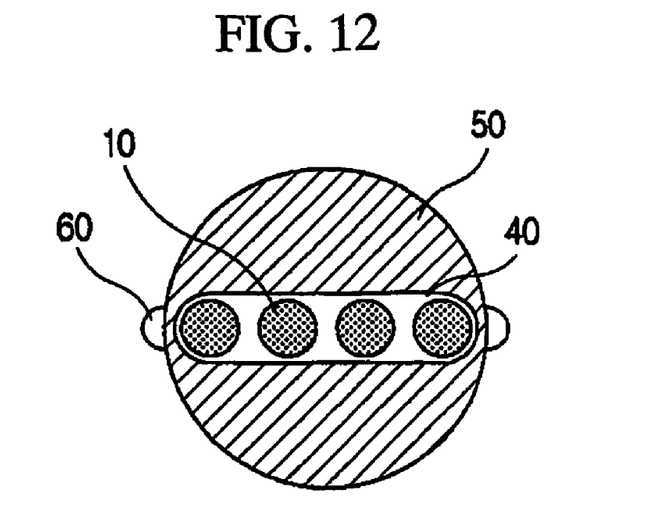
FIGS. 12 to 15 are sectional views showing multi-core optical fiber units according to preferred embodiments of the present invention.

Specifically, the optical fiber unit of FIG. 12 includes a multi-core ribbon-type optical fiber 40, and a protective layer 50 formed to surround the optical fiber 40, and protrusions 60 having a semicircular section are formed on the outer surface of the protective layer 50.

Figure 13:
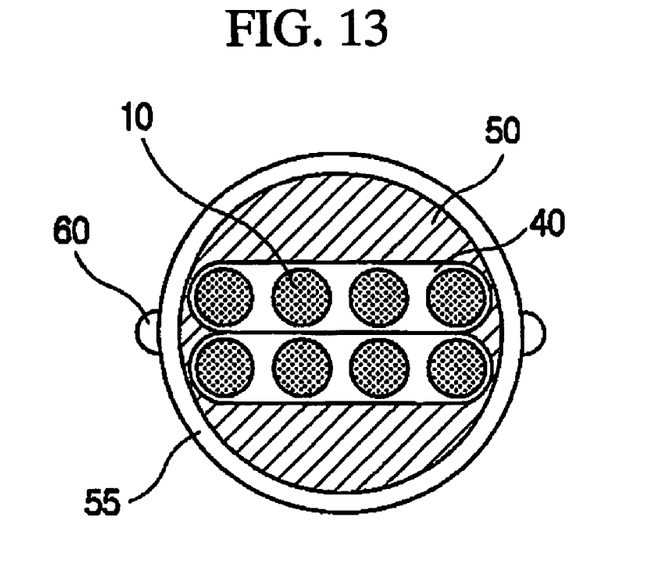
Figure 14:
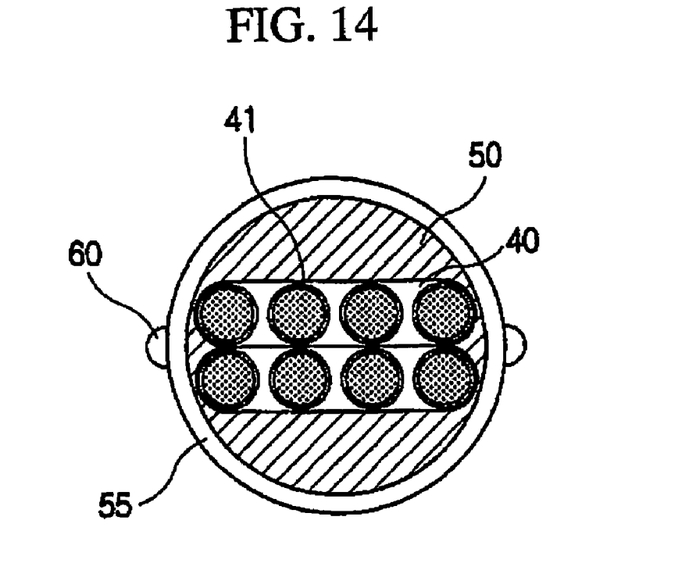
Figure 15:
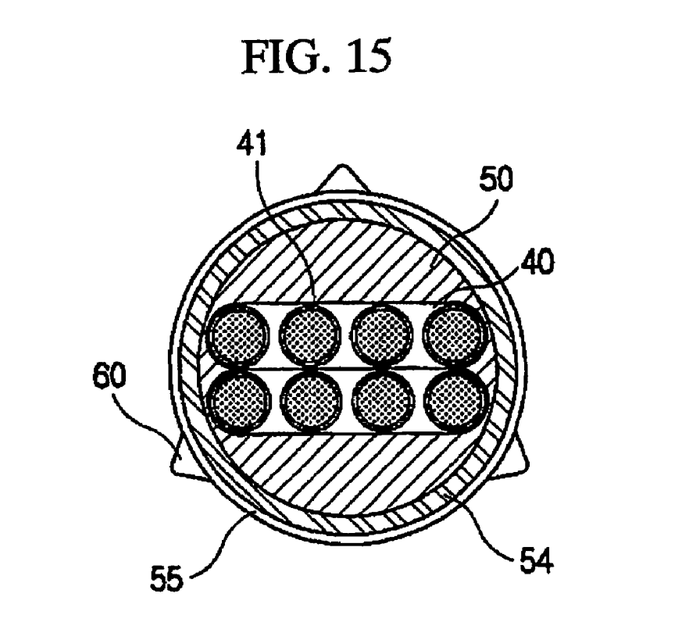

The optical fiber unit of FIG. 13 further includes a sheath 55 and two multi-core ribbon-type optical fibers 40 are piled up, compared with that of FIG. 12. The optical fiber unit of FIG. 14 is different from that of FIG. 13 only in the point that a coloring layer 41 is formed to surround each optical fiber in the multi-core ribbon-type optical fiber 40. In addition, the optical fiber unit 15 is different from that of FIG. 14 in the points that an intermediate layer 54 is interposed between the protective layer 50 and the sheath 55, and protrusions 60 symmetrically formed on the sheath 55 have a triangular section.

Now, a method for forming the protrusion of a banded shape is described in detail.

Figure 16:
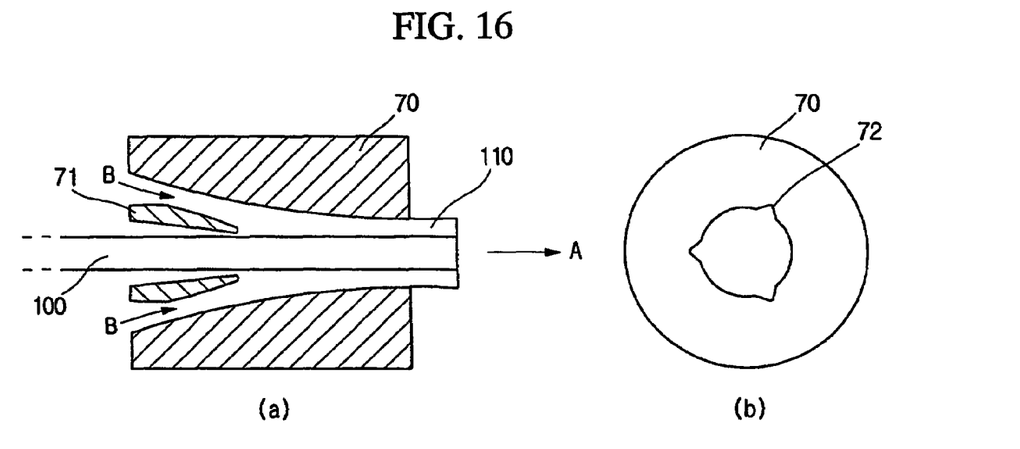
FIG. 16 is a schematic view for illustrating a method of manufacturing an optical fiber unit according to an embodiment of the present invention.

The protrusion may be formed using an extrusion process. FIG. 16 is a section view (a) schematically showing an extrusion dice (a mold) used in a preferred embodiment of the present invention, and a side view (b) showing the extrusion dice seen from an output portion. The extrusion dice 70 coats a protective layer 110 by supplying polymer resin in a direction of the arrow B on the outer surface of an optical fiber 100 with passing the optical fiber 100 through a nipple 71 in a direction of the arrow A. The output portion is generally formed circular. In this embodiment, the output portion of the extrusion dice 70 is basically circular, and grooves 72 in a shape of triangle, semicircle, arc, trapezoid, or unevenness are formed in the output portion as shown in FIG. 16(*b*).

Thus, if the optical fiber 100 is passed through the extrusion dice 70 and polymer resin is supplied on the outer surface of the optical fiber 100 as shown in FIG. 16, the protective layer 110 is coated on the outer surface of the optical fiber 100 and the extrusions of a banded shape are formed thereon according to the shape of the grooves 72.

On the other hand, the optical fiber 100 passing through the extrusion dice 70 may be a simple-core optical fiber shown in FIG. 11, or a ribbon-type optical fiber as shown in FIGS. 12 to 15. Furthermore, the protrusions of a banded shape may be separately formed while an optical fiber which is already coated with a protective layer is passed through the extrusion dice of FIG. 16. In this case, the protective layer (or, a sheath positioned in the outermost layer if the protective layer is composed of several layers) may be made of different material to the protrusion. Thus, in this case, it is preferable to coat glass, ceramic or polymer resin on the surface of the optical fiber having the protective layer and the protrusions after the protrusions are formed.

Moreover, if the extrusion dice 70 is rotated clockwise or counterclockwise on a plane perpendicular to the extruding direction or the optical fiber 100 is rotated, it is possible to make the optical fiber unit having protrusions of various patterns such as spiral pattern or waved pattern. For example, the protrusion 31 shown in FIG. 4 may be obtained by rotating the extrusion dice or the optical fiber in clockwise and counterclockwise directions by turn. In addition, the discontinuous protrusions 32 shown in FIG. 5 may be obtained by discontinuously supplying the polymer resin for formation of the protrusions. In other words, the protrusions 32 may be formed by stopping supply of polymer resin for a predetermined time or absorbing the polymer resin to a direction opposite to the supply direction (or, a direction of the arrow B in FIG. 16).

If the protrusions are formed in a spiral or waved pattern and/or discontinuously, the optical fiber unit may receive more fluid drag force during the air blown installation.

Figure 17:
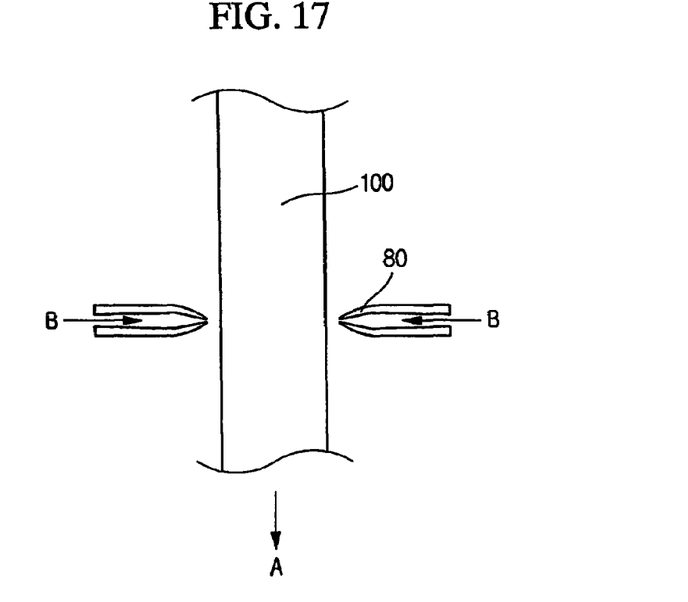
FIG. 17 is a schematic view for illustrating a method of manufacturing an optical fiber unit according to another embodiment of the present invention.

FIG. 17 is a schematic view for illustrating a method for forming protrusions according to another embodiment of the present invention. In this embodiment, a nozzle 80 is used for forming the protrusions instead of the extrusion dice. In other words, at least one nozzle 80 is arranged near the outer surface of the optical fiber 100 which passes to a longitudinal direction (or, a direction of the arrow A), and polymer resin is supplied through the nozzle 80 in a direction of the arrow B so that the protrusion of a banded shape is formed on the outer surface of the optical fiber.

When the nozzle 80 is used, it is possible to make spiral or waved protrusions continuously or discontinuously. In other words, if the nozzle 80 is rotated clockwise or counterclockwise on a plane perpendicular to the advancing direction of the optical fiber, or the optical fiber 100 is rotated, the optical fiber unit having the above-mentioned protrusions having various patterns such as a spiral pattern or a waved pattern may be obtained. In addition, the protrusion may be formed discontinuously by stopping supply of the polymer resin for a predetermined time or absorbing the polymer resin to a direction opposite to the supplying direction of the polymer resin (or, a direction of the arrow B in FIG. 17).

Now, a process of installing the optical fiber unit configured as above by means of blown air is described in brief.

Firstly, a tube is installed at a spot where installation of an optical fiber unit is scheduled, and then an optical fiber unit is blown by air pressure to a desired position by means of an installing machine. Generally, the optical fiber may be installed up to about 1 km at once without connection. If the optical fiber unit is installed in a region having a longer distance than the common cases, the optical fiber units are installed from the center of the region to both ends. Or else, air is blown from one end, an optical fiber bundle coming out through the other end is bound, and then the optical fiber unit is installed to a remained area of the region. The optical fiber unit may be installed by blown air by such ways even in a region longer than 1 km. If the installation of the optical fiber unit is complete, the optical fiber bundle is exposed as much as the area occupied by the installing machine, so a separate protective combination tube (or, a closedown) is used to seal the exposed optical fiber bundle.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the optical fiber unit for air blown installation and its manufacturing method, a continuous or discontinuous protrusion of a banded shape is formed on the surface of the optical fiber unit so that the optical fiber unit may receive more fluid drag force during the installation process. In addition, the optical fiber unit basically has a circular section, so it is possible to reduce the direction of optical fiber unit during the installation process.

Moreover, since the optical fiber unit of the present invention does not have expensive beads which are conventionally used, there is no need to conduct a process of mixing or stirring beads to resin used for forming an outer coating and a process of forming an intermediate layer. Thus, productivity is increased and manufacture costs are lowered.

In addition, since the protrusion is made of the same material as the outer coating layer or coated by the same material as the outer coating layer though the protrusion is made of material different from the outer coating layer in the present invention, adhesive force between the coating layer and the protrusion is not deteriorated.

What is claimed is:

1. An optical fiber unit for air blown installation into a tube, comprising:
    at least one optical fiber having core layer and clad layer;
    a protective layer coated on a surface of the optical fiber;
    a protrusion for receiving fluid drag force when the optical fiber unit is installed with use of blown air, wherein the protrusion is made of polymer resin and formed on an outer surface of the protective layer in a banded shape; and
    a coating layer coated on the surfaces of the protrusion and the protective layer and made of one selected from the group consisting of glass, ceramic and polymer,
    wherein the protrusion is large enough to create a sufficient fluid drag force in order for the fiber to be installed by air blown installation,
    wherein the protrusion is formed discontinuously.

2. An optical fiber unit for air blown installation according to claim 1, wherein the protrusion has a spiral, waved or sine-waved pattern.

3. An optical fiber unit for air blown installation according to claim 1, wherein the protrusion has a sectional shape of triangle, semicircle, arc, trapezoid, or unevenness.

4. An optical fiber unit for air blown installation according to claim 1, wherein the protective layer includes a buffer layer surrounding at least one optical fiber, and a sheath surrounding the buffer layer.

5. An optical fiber unit for air blown installation according to claim 4, wherein the buffer layer has Young's modulus and hardness smaller than the sheath.

6. An optical fiber unit for air blown installation according to claim 4, wherein an intermediate layer is provided between the buffer layer and the sheath in order to damp external impact.

7. An optical fiber unit for air blown installation according to claim 6, wherein Young's modulus and hardness of the intermediate layer are smaller than those of the sheath and larger than those of the buffer layer.

8. An optical fiber unit for air blown installation according to claim 1, wherein the protrusion is made of the same material as the protective layer.

9. An optical fiber unit for air blown installation according to claim 1, wherein the optical fiber includes a multi-core ribbon-type optical fiber, and the protective layer has a circular sectional shape.

10. A method for manufacturing an optical fiber unit for air blown installation, comprising:
    forming a protrusion for receiving fluid drag force when the optical fiber unit is installed with blown air having a banded shape on the outer surface of at least one optical fiber having core layer and clad layer by supplying polymer resin onto an outer surface of the optical fiber while passing the optical fiber through a hollow extrusion die in which a predetermined groove is formed in an inner surface thereof,
    wherein the protrusion is formed discontinuously by supplying the polymer resin onto the outer surface of the optical fiber discontinuously.

11. A method for manufacturing an optical fiber unit for air blown installation according to claim 10, in the protrusion forming step,
    wherein a protective layer is formed on the outer surface of at least one optical fiber, and the protrusion is formed on an outer surface of the protective layer.

12. A method for manufacturing an optical fiber unit for air blown installation according to claim 10, in the protrusion forming step,
    wherein the protrusion is formed in a spiral, waved, or sine-waved pattern by rotating the extrusion die around the optical fiber or rotating the optical fiber which is passing through the extrusion die.

13. A method for manufacturing an optical fiber unit for air blown installation according to claim 10, further comprising the step of coating any of glass, ceramic and polymer resin on the surface of the optical fiber having the protrusion.

14. A method for manufacturing an optical fiber unit for air blown installation, comprising:
    forming a protrusion for receiving fluid drag force when the optical fiber unit is installed with use of blown air having a banded shape on an outer surface of at least one optical fiber having core layer and clad layer by supplying polymer resin through a nozzle onto the outer surface of the optical fiber while moving the optical fiber along a longitudinal direction thereof,
    wherein the protrusion is formed discontinuously by supplying the polymer resin onto the outer surface of the optical fiber discontinuously.

15. A method for manufacturing an optical fiber preform for air blown installation according to claim 14, in the protrusion forming step,
    wherein the protrusion is formed in a spiral, waved, or sine-waved pattern by rotating the nozzle around the optical fiber or rotating the optical fiber.

16. A method for manufacturing an optical fiber unit for air blown installation according to claim 14, further comprising the step of coating any of glass, ceramic and polymer resin on the surface of the optical fiber having the protrusion.

* * * * *